(12) United States Patent
Lumelsky et al.

(10) Patent No.: US 6,529,950 B1
(45) Date of Patent: Mar. 4, 2003

(54) POLICY-BASED MULTIVARIATE APPLICATION-LEVEL QOS NEGOTIATION FOR MULTIMEDIA SERVICES

(75) Inventors: Leon L. Lumelsky, Stamford, CT (US); Nelson R. Manohar, New York, NY (US); Stephen P. Wood, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,275

(22) Filed: Jun. 17, 1999

(51) Int. Cl.[7] .............................................. G06F 13/14
(52) U.S. Cl. ...................................... 709/218; 709/219
(58) Field of Search ................................ 709/217–219

(56) References Cited

U.S. PATENT DOCUMENTS

| | | | |
|---|---|---|---|
| 5,341,477 A | * | 8/1994 | Pitkin et al. ................. 395/200 |
| 5,768,508 A | * | 6/1998 | Eikeland |
| 5,848,234 A | * | 12/1998 | Chernick et al. ...... 395/200.33 |
| 5,864,604 A | * | 1/1999 | Moen et al. |
| 6,044,403 A | * | 3/2000 | Gerszberg et al. |
| 6,285,977 B1 | * | 9/2001 | Miyazaki ..................... 703/26 |

* cited by examiner

*Primary Examiner*—Emanuel Todd Voeltz
(74) *Attorney, Agent, or Firm*—Scully, Scott, Murphy & Presser; Douglas W. Cameron, Esq.

(57) ABSTRACT

A Resource Management Framework (RMF) comprises an extensible, distributed, policy-based, object-oriented system and method for resource discovery and negotiation during the setup and control of a media session between one or more media servers and end users. The scope of the RMF framework is the management of multimedia resources used during simple, non-interactive as well as composite, complex, interactive multimedia sessions. The RMF enables iterative negotiated mapping over the requirements of an RMF-compliant application onto the offerings of one or more RMF-compliant media servers. It is an open-services architecture providing the ability to insert and apply services to enhance the suitability of offerings to requirements and vice versa, during a negotiated mapping session. Moreover, the RMF negotiated mapping algorithm itself is customizable via the use of policies (herein referred to as per-flow policies). The policies used to drive management decisions and service selections during these negotiated mapping are 'pluggable'. New or updated policies may be added, to augment or replace an existing policy so as to realize new behavior or refine existing behavior.

28 Claims, 4 Drawing Sheets

POLICY-BASED MULTIVARIATE APPLICATION-LEVEL QOS NEGOTIATION FOR MULTIMEDIA SERVICES

BACKGROUND OF THE INVENTION

1. Field of the Invention

The present invention relates generally to systems and methods for managing distributed multimedia resources on wide area networks, and particularly, to a system and method for brokering multimedia resources and services to multimedia clients.

2. Discussion of the Prior Art

Consider two content providers CP1 and CP2, each being associated with a particular content vault or repository containing intellectual property for their respective organization. Some examples of such intellectual property are news, stock quotes, MP3 files, distance learning classes, organizational procedures, etc. Means to sell such content is often desirable and is foreseen to be an increasing revenue stream in the next generation Internet. Thus, it is widely felt need in the arts for a system providing access and reuse of content repositories across organizations to enable a new level of inter-organization cooperation across organizations.

For instance, it would be highly desirable to realize brokering functionality between media servers and applications that enables processing of free-form requests comprised of both content requirements (e.g., "the most recent headline news content from any major news outlet") as well as presentation requirements (e.g., "where the content can be delivered with high quality and not exceeding total cost of more than $1), and, particularly, mapping of such requests to media servers that can satisfy such request specification.

To date, there is no integrated approach that provides the ability to explore content across independent organizational repositories in terms of both search (e.g., metadata about content) and delivery (e.g., feasibility about content) parameters. To this end, an open system infrastructure that allows reuse of content, security, billing, exploration of content, exploration of end-to-end QoS issues, etc., is tremendously desirable.

SUMMARY OF THE INVENTION

It is an object of the invention to provide an extensible, distributed, policy-based, object-oriented framework for managing multimedia resources and providing resource discovery and negotiation during the setup and control of a media session between one or more media servers and end users regardless of the complexity of the multimedia session.

It is a further object of the present invention to provide an extensible, distributed, policy-based, object-oriented framework that provides brokering functionality between media servers and applications in order to produce a free-form request specification [x[1], x[2], . . . , x[m]] comprised of both content requirements (e.g., "the most recent headline news content from any major news outlet") as well as presentation requirements (e.g., "where the content can be delivered with high quality and not exceeding total cost of more than $1) and that includes compliant media servers that provide offerings known to satisfy such a request specification.

In addition to the objects stated above, it is another object of the present invention to provide an extensible, distributed, policy-based, object-oriented framework that provides an open systems architecture to enable web-like exploration of content provider repositories known to be compliant, and further that enables the building of browsers for searching multimedia content conditioned to constraints such as quality and cost.

According to the principles of the invention, there is provided a Resource Management Framework ("RMF") that provides building blocks used to build a mapping system for negotiating multivariate application-level quality of service specifications across the offerings from one or more candidate servers. A brokering nucleus implements an iterative negotiated mapping process between user (i.e., session) requirements and systems (i.e., service, and resource) constraints. Particularly, the set of application constraints is negotiated against media servers and server offerings are obtained. Each negotiation constraint is supported by an interface that encapsulates an aspect of a system (hereinafter, "facade") that enables a server to be accountable for the reliable implementation of a mapping commitment. In the RMF, facades raise the compliance level of a media server aspect to a common ground. In this way, media servers are seen as equals with regards to this aspect.

Particularly, the RMF framework implements brokering functionality that is capable of mapping such requirements onto feasible server offerings. For example, an RMF negotiator computes a distance vector (a metric determining the suitability of requests to matches) between the individual specification and offerings and determines which of these are the most feasible. The mapping functionality of the invention is particularly implemented for transposing a generic request to a specific request taking into account application, user, and system requirements and constraints. Sets of matches or potential matches, conformant to various installable policies, are created/modified at various stages in the framework. The set of matches may be altered by application or user's preferences, requirements, or system conditions, to create a modified set of service matches for the request. Modification of the set, with preferences/needs and/or system conditions, is governed by installable policies that control the modification process. Ultimately, out of a set of potential matches, for a given service, one specific service will be chosen to serve the generic service request. This selection may be entirely done by the framework or, where there may be a higher level of ambiguity in the satisfaction of the service request, the selection may be done in concert with the application and end-user. Sets of matches may be cached throughout the framework for re-use either later in the current session or for future sessions.

To realize an extensible and flexible negotiated mapping framework, the RMF is customizable via the use of policies. The policies, upon which management decisions and service selections are based, are 'pluggable' and new or updated policies may be added, to augment or replace existing policy and allow new behavior or refinement of existing behavior. Moreover, the RMF provides physical and logical hooks to allow the insertion of an arbitrary service into the negotiated mapping algorithm.

According to the principles of the invention, the RMF framework enables the creation of a new class of browser applications that enables searching content by both static attributes about the content and dynamic attributes about the supporting infrastructure. Via the use of RMF management layer objects, it is possible to create a new class of search browsers that may search for content in terms of static constraints such as format, resolution, and access rights as well as qualifying dynamic constraints such as cost and quality of service. For example, RMF objects such as directories allow the representation of these vaults in terms of key searchable attributes of interest to classes of applications. RMF directories may be used to efficiently store metadata about the static attributes of content whereas the RMF brokering objects may be used to derive the dynamic attributes about the delivery of content to a particular application or client. Moreover, via the use of RMF facades, it is possible to extend such searches across multiple organizations.

The RMF brokering nucleus provides the ability to explore an iterative refinement of the constraints exposed by the content delivery browser. Such exploration and negotiation may produce a set of zero or more feasible mappings for which the specified conditions are met. For any resulting mapping, once accepted, the RMF guarantees the resulting binding for its lifetime. For example, the RMF objects would deliver fault resiliency and interactivity control over a binding in order to manage their impact over promised QoS.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
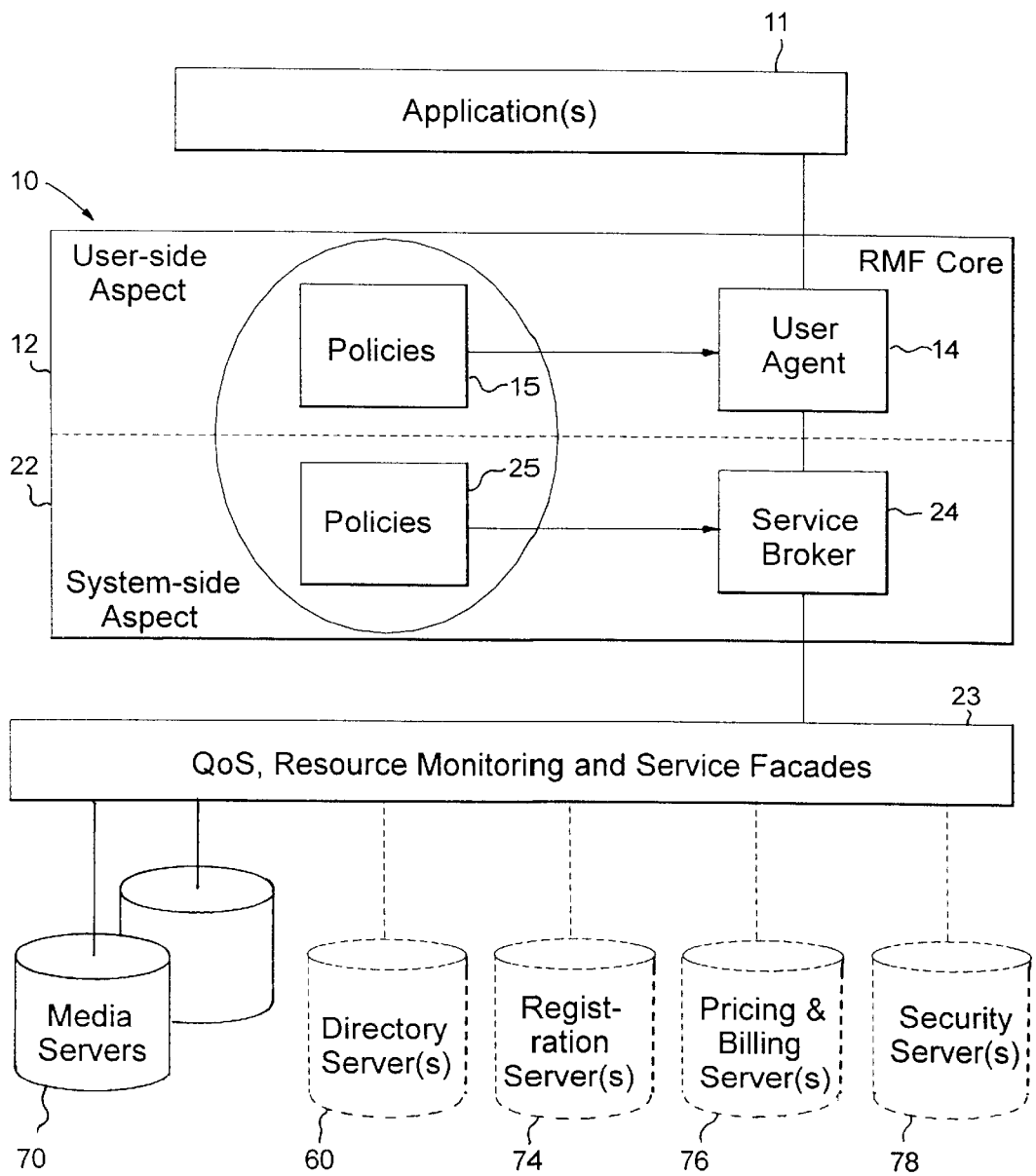
FIG. 1 depicts a high level view of the user and system aspects of the RMF.

FIG. 1 illustrates the main aspects of the RMF system 10 of the invention. As shown in FIG. 1, the RMF has two main aspects relating to service provisioning: 1) a user aspect 12; and, 2) a system aspect 22. The user aspect functions are handled by a user agent 14 and includes mapping the user's preferences and capabilities of the client. The behavior of the user agent 14 is governed by one or more installable policies 15 that reflect priorities and selection criteria etc. to be used by the agent, when locating one or more services that may match the application's request. Such a request to the RMF 10 would be generated by the application 11 when the user asks for service(s), for example, in the form of viewing a presentation. When this request results in multiple matches to more than one service, the user agent, via its policies, may discriminate amongst choices on the user's behalf. If there is still ambiguity then the user agent 14 may be directed, by policy, to interact with the user, via the application 11, in order to make a choice. Interaction may also take place if the user wishes to preview the selected service(s). Previewing allows the user to assess the media content and/or the media quality of the selection in order to gauge acceptability of the offered service even if there is no ambiguity in the service mapping. When a service has been started then a contract, i.e., a policy for service delivery, may be established between the user and the system that includes the service guarantee and conditions of use. Such conditions may include agreements of cost, availability, quality, etc., and may indicate if and how the service should/may be altered during execution if conditions change. When necessary, a failure of service delivery as specified in the contract may cause a re-negotiation of both the service and the service contract.

The system aspect 22 of the RMF 10 is handled by service brokers 24 whose function includes mapping the application's request to a service considering the location and availability of the requested service(s). The service broker's behavior is also governed by installable policies 25 that have control over mapping behavior, e.g., how load balancing is done. To find locations to where services may be potentially mapped a hierarchical directory is used that contains information about the services and that may be used to locate an appropriate source for a given service. The hierarchical directory is organized to allow efficient updating as services are changed/added and allow efficient inquires to locate services. Once service(s) that meet the system's needs and control criteria are located, they may be returned to the user agent 14 for further sub-selection as described above. The service broker 24 may also pool or aggregate resources and/or users, where policies allow and users are agreeable, in order to offer more attractive or improved service(s) to the users and/or provide more efficient use of RMF resources.

In operation, an application 11 generates a request for service that contains a generic service identifier along with other optional selection request criteria. The form of the request for service is depicted herein as comprising the form $(x1, x2, \ldots, xn)$. For example, a service may be available in a number of content types, (e.g., video or audio-only) and for each type there may be several representations (e.g., high quality for very capable devices and low quality for hand-held lesser capable devices).

Authoring hints and/or naming conventions may be used to facilitate location. For example, optional selection criteria would allow the request to be qualified with authoring and application preferences (and hints) that seek to assert control over the nature of service is received. For example, the particular application/author may require both video and audio although an audio only version of the service is available. Such hints may mandate that a particular type(s)/quality(s) are used or list them to be preferred selections.

Figure 2:
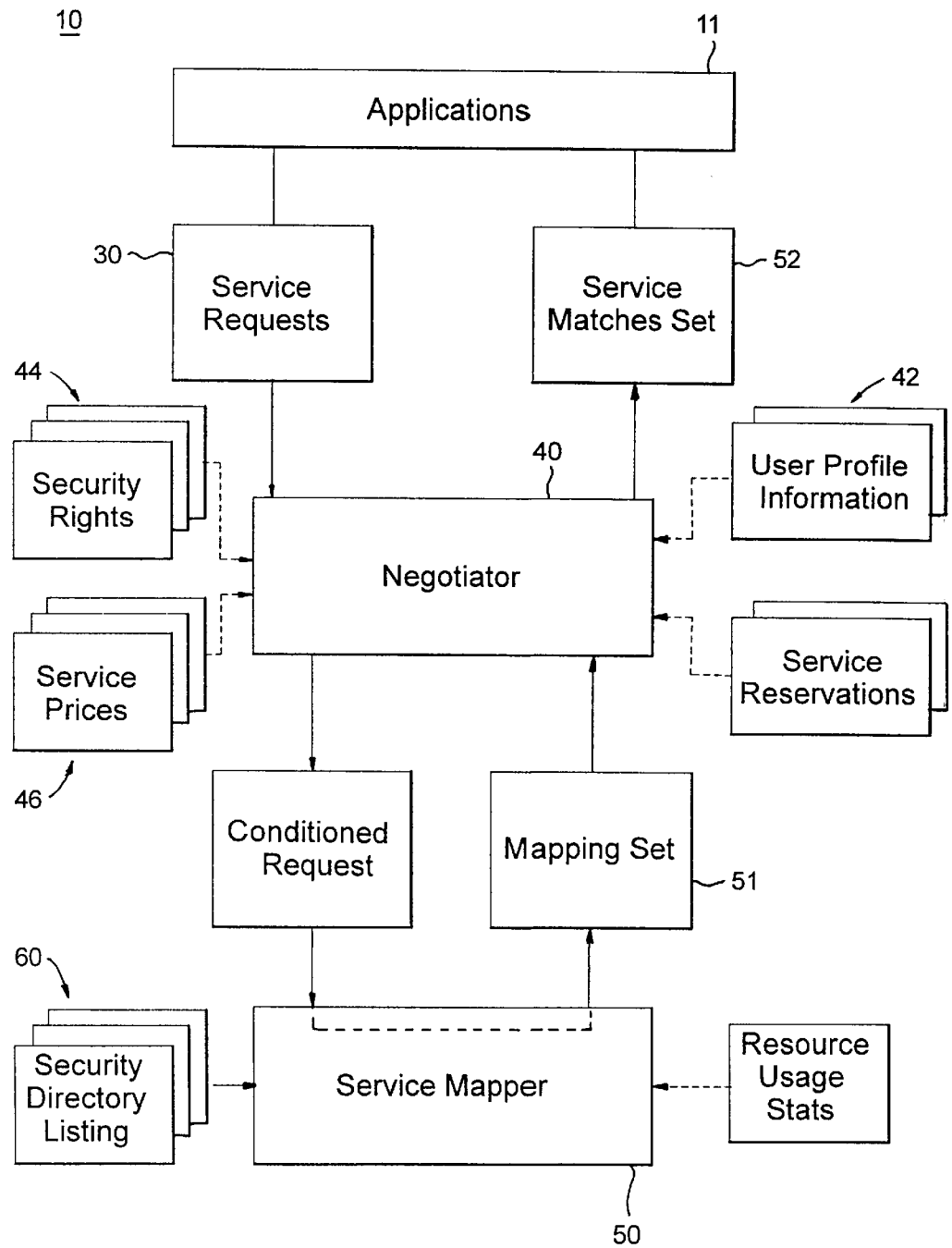
FIG. 2 depicts a high level view of the RMF components.

The service request is then processed, according to RMF system functions 22, to locate one or more service instances that can satisfy the request. The basic framework 10 includes implementations of service directories (not shown) for locating content service instances. An extended framework may include load balancing and other aggregation aspects in determining which service instances to use. The service instances are first located by a service mapper and combined into a mapping set that is passed back to a negotiator 40 (FIG. 2). The mapping set may contain zero or more instances of locations where the content is located and from which a service instance may be instantiated. When the mapping set is received back by the negotiator the set characteristics $(y1, y2, \ldots, yn)$ is compared to the original application's request $(x1, x2, \ldots, xn)$. Depending on the exact nature of the applications request, the negotiator may need to call for further service mappings, for example, to determine if a service exists in the type and quality that the user preference expresses. Certain system function matches may thus be discarded or may be invalid when intersected by the negotiator with user aspects of profile information, preferences, costs, etc. The resultant match or set of matches is returned to the application 11. A set would be returned if the negotiator could not disambiguate amongst equally weighted but different selections. Now the application with its knowledge, either alone or in conjunction with user interaction, may select a service from amongst the set.

Previewing a service, to assess its quality and/or content may also be part of this overall mapping process that ultimately results in the user receiving service.

FIG. 2 illustrates the core components of the extensible RMF system 10 including the mandatory core components such as the Service Requester 30, the Negotiator 40, the Service Mapper 50, the Service Directories 60, and the media servers 70 (FIG. 1) and which form the basic minimum framework that may be utilized for media location and service delivery; and, other optional function components (shown with dotted outlines) that may be used to extend the basic framework to provide additional service or capabilities. An application using the mandatory basic framework offers basic media services to an end user.

This basic framework provides service location transparency through a mapping of an application's service request, containing a generic service identifier, into a specific system identifier containing a complete service reference that is used by the application to access the media service. Location transparency enables the framework to provide fault tolerance and high availability of services. An application written to RMF, makes a request to the framework to provide media services to the end user. The request may ultimately result in a variety of media being streamed to the user from a diverse set of widely distributed media servers that are related together by the application to form a media-rich composite presentation.

The mandatory composition of the RMF extends location transparency to the mapping of client requests onto media servers. Optional compositions incorporate the analysis of user preferences, security (authentication and authorization), pricing and billing, reservations, and resource monitoring during the mapping of a request.

The service mapping function is a key feature of the RMF framework as it performs the transformation of a generic service request into one or more specific service instances using a variety of service selection criteria. The mapping transformations are done considering a number of aspects with installable policies controlling what criteria are used and the order and precedence of using those criteria in the selection mapping process.

Specifically, a generic request is transposed to a specific request taking into account application/author, user and system needs/wants/constraints. Sets of matches or potential matches, conformant to various installable policies, are created/modified at various stages in the framework. The set of matches may be altered by the application of application/author's or user's preferences/needs and/or system conditions, to create a modified set of service matches for the request. Modification of the set, with preferences/needs and/or system conditions, is governed by installable policies that control the modification process. Ultimately, out of a set of potential matches, for a given service, one specific service will be chosen to serve the generic service request. This selection may be entirely done by the framework or, where there may be a higher level of ambiguity in the satisfaction of the service request, the selection may be done in concert with the application and end-user. Sets of matches may be cached throughout the framework for re-use either later in the current session or for future sessions.

The Service Requester component 30 is the application's portal to the RMF, by taking application requests for service and forwarding them to the Negotiator 40 so that a service set, containing one or more locations where the service may be obtained, is returned. For the case that the set returned by the negotiator 40 contains more than one location it is up to the application, potentially interacting with the user, to choose one from the set.

The Negotiator 40 takes an application's request for service and passes it to the Service Mapper component 50 to locate services that match the request. There may be more than one service mapper in the RMF where mappers may be specialized by service, by provider. It is up to the negotiator to locate an appropriate mappers(s). It is up to the service requester to locate an appropriate negotiator(s). The authors of the presentation may recommend negotiators by adding such recommendations within the presentation for the application to utilize and pass onto the service requester. The user may also specify a preference for negotiators, either via the application or independent of the application in the user's profile in the extended RMF. Finally trader directories, listing negotiators, may also be used to locate a negotiator(s) for the service(s).

The service mapper core component 50 uses service directory information 60 to locate requests for service(s) on media servers that may deliver the requested service. An optional load balancing extension, that may be derived from resource monitoring, may be applied to the directory matches and servers selected into the mapping set according to installable policies for load distribution. The service mapper 50 will return a set of possible mappings of servers that can offer the requested services. The mapper may include notions of availability and load balancing and will apply its in stalled policies in generating the mapping set that is returned to the negotiator. The negotiator 40 will then apply its own installed policies to update/modify this set before it is returned to the service requester. The negotiator may apply user preferences 42, rights to access the service(s) 44, costs of services 46, etc. to the mapping set so that the newly updated/modified set now complies with these additional criteria.

Such additional criteria are not part of the mandatory core framework but are optional extensions—in this case the negotiator is an extended negotiator that can handle these extra modifiers/constraints. The resultant set, as updated/modified by the negotiator, is returned to the service requester. To extend the framework not only are additional components added but extensions are required to some of the core components too, dependent on the additional components. For example, resource monitoring may be accomplished by monitoring the load on media servers through the media service facade interface 23, however, that interface is not required in the basic core framework and the function to support it is not in the basic service mapper component.

A set of one or more matches 51 or partial matches may be returned to the negotiator. Partial matching may require the negotiator to do further mapping reduction, e.g., a mapper may provide a partial match that indicates a domain where there is also a high probability of locating the service, but that requires contacting the mapper for that domain for further resolution. Matches may or may not include type and representation, depending on how the request was specified.

As shown in FIG. 2, service directories 60 enable the service mapper to look up a service and resolve it from a unique service identifier to a service specific set of one or more locations where the requested media may be found. The directories may be organized hierarchically, or, be based on service type, e.g., video, audio or audio/video, 3D, etc. A service is identified uniquely and may exist as a number of service types, with each type may existing in a number of qualities, e.g., low, medium and high. An application may request the service or service and/or type and/or quality depending on the nature of the application. The combination of type and quality for a given content is referred to as a representation of that content. The service directory hierarchy may extend into the media servers with directory information and specific knowledge of the each service type, quality and other keyword information being found there. Promoting this information into higher levels of the directory hierarchy is possible with tradeoffs being made of directory maintenance (updates/additions) against directory lookups.

Figure 3:
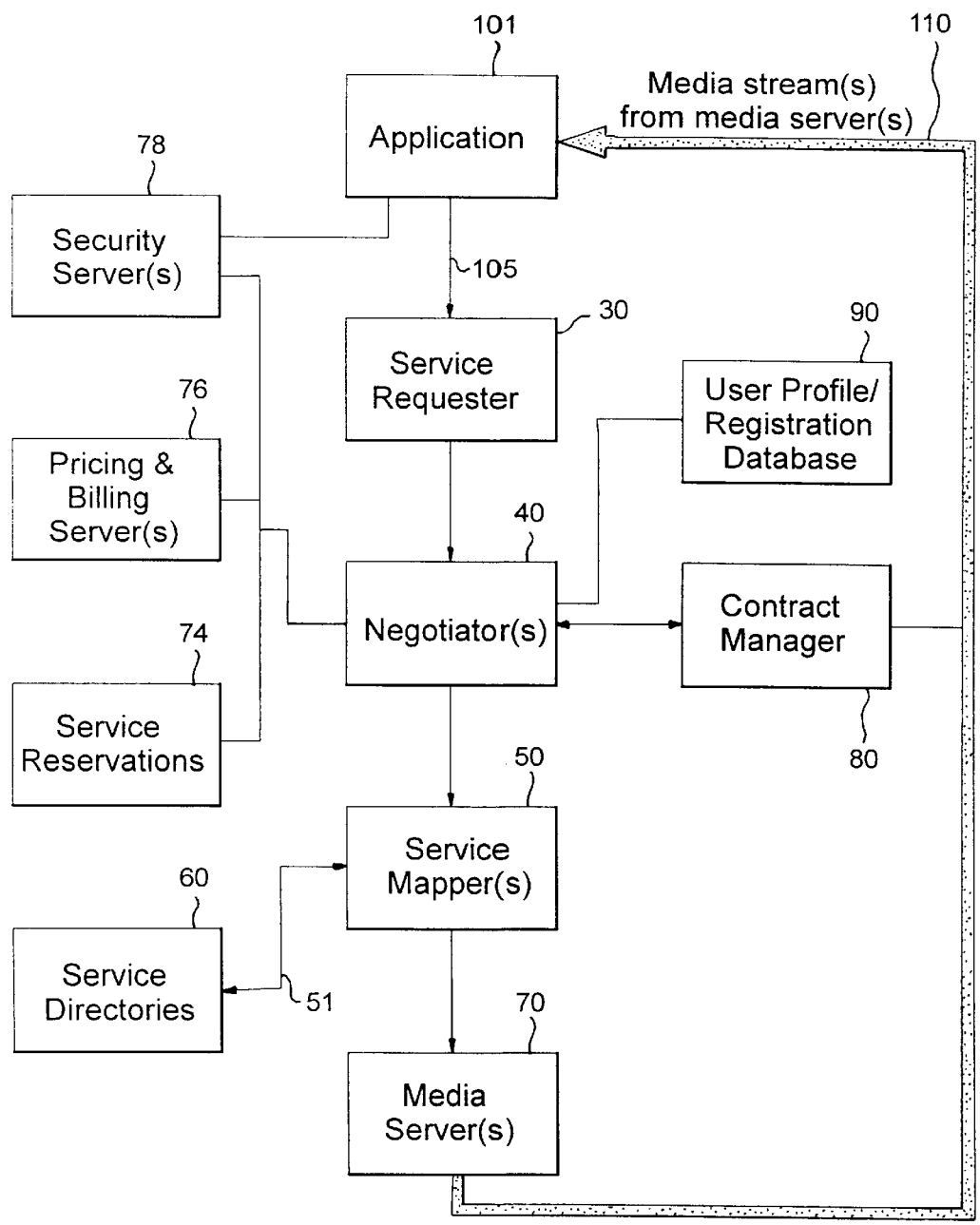
FIG. 3 is an illustration depicting the RMF Mapping Algorithm.

As shown generally in FIGS. 1 and 3, RMF service facades (interfaces) 23 are defined so that optional servers, such as security server(s) 78 may be added to provide authentication and/or authorization services. Thus, whenever a component of the RMF needs authentication or authorization, these security servers are used. A database of users 90 (FIG. 3) allows profiles and preferences of the user to be stored for access by the system. Aspects of the database may be updated by the user, e.g., preferred cost or quality criteria. Other aspects may be reserved for the framework. Such a database may be used for security to authenticate a user, authorize billing for services or service reservation etc. RMF facades are defined so that pricing and billing servers 76 may additionally be added. Pricing enables media services to be offered at various costs and permit a wide variety of pricing policies while billing allows the cost of the service to be charged to the service user. The optional servers that are part of the extended RMF, are shown with dotted lines FIGS. 1 and 3 to differentiate them from servers that are part of the mandatory core framework. Other optional servers include: registration server(s) 74 that comprise user-oriented data, such as profiles containing preferences, group memberships, etc.; pricing and billing server(s) 76 that allow services to be offered and billed accordingly, with security servers providing the necessary authorization and authentication support. The optional servers listed are examples and the framework is not limited to only those types.

Moreover, the RMF service facades enable the insertion of services into the negotiated mapping. For example, it may happen that the search criteria are unfeasible (i.e., no organization can be located by the brokers containing and/or willing to deliver the object under the requested constraints). For example, a client may request an audio track for $1 at high quality. However, no content provider is willing to provision that track for less than $5. Thus, it is an aspect of the present invention that the RMF brokering objects rely on insertion services such as an AD/INSERTION filter to lower the presented cost to the client for the provision of the track. To illustrate this concept, it is possible that the brokering nucleus may request from the AD/INSERTION service to determine if it is possible to subsidize content to just $1 at high quality for a particular request. The AD/INSERTION would determine in such case where it could insert advertisements and make the request feasible. Via the RMF contract negotiator objects, payments and/or credits would flow to the respective parties.

Media servers 70 are the ultimate source of service(s) to the end user. The service may be streamed to the user or downloaded and then used depending on the type, temporal constraints etc. Media servers may be dedicated to a particular service type and/or quality or may support a variety of types and qualities (representations). It should be noted that a media server 70 may be a single media server or it may be a controller for a media server cluster where management of the cluster may still be handled at the cluster level by the cluster controller. For example, the cluster as a whole may be treated by the RMF as a single server having the total capacity of the cluster where the cluster controller will continue to manage load balancing and distribution for the individual servers in its cluster. Media servers provide function to the RMF through a media server facade that is a set of interfaces that define how the media server should conform to the various functions it provides. Such interfaces define function to access the media, provisions to publish or update media, authorization, and authentication checking on media access etc.

The mandatory core components provide a basic minimum framework that may be extended to provide other further enhanced framework compositions. These include such functions as: user accounts with profiles/preferences, security (authorization and authentication), reservations of services for future bookings, service contract management to provide services other than best effort and resource monitoring. Some functional extensions may have interdependencies and may only be added into the framework as a set of components. For example, user billing is not realistic without security as both requires a user registration database to identify the user's account and profile. However, if the framework already included security and user profiles, and all media content has been supplied free, then billing may be added and the framework extended since the dependencies were already present in the framework.

Referring back to FIG. 2, when the user/application 11 wants to accept a service from the set of returned matches 52 it does so by forwarding an acceptance to the service requester. This is then used by RMF to commit that service along with an appropriate level of service contract. Consequently, user interactions are forwarded by the service requester so that they may be validated against any service contract before the media session(s) is adjusted accordingly. When a service is active, any request(s) that alter the service session, such as a result of user interactivity, may be received and are validated against any service contract with the media session before being adjusted accordingly, if necessary. For example, pausing a service may require the service booking with the media server to be amended, or user interaction may cause another service to be started or require QoS to be altered to update the quality as the level of detail for a given media is adjusted. Level of detail may be adjusted, for example, if the client/user clicks on a media in the background of a computer screen GUI and the application brings it to the foreground within the presentation. In the background it may have been present in a low quality form, but as the user has indicated an interest in the media by clicking on it, it will be delivered in high quality. Also, when a service is active, the negotiator will be informed of any service delivery contract violations that occur and may act to reestablish service according to its installable policies, user preferences etc. It is understood that the RMF core supports 'best effort' delivery.

Contract violations are also part of the optional extended framework. A contract violation may require a service to be re-negotiated in the case where the service must be offered from a new location. If cached mappings cannot satisfy this, then a new mapping may be generated. According to the contract, the user may be informed and interact with this new setup of replacement service. For example, when it is unable to maintain the required QoS level then an exception is raised to the RMF, which may then, according to policies involved, attempt to obtain the service elsewhere. To this end, as illustrated in FIG. 3, a contract manager 80 allows services to be provided and their ongoing provisioning to the user managed according to an agreed service level. The contract manager 80 monitors an ongoing service for any violations of contract and will take steps to remedy any failures. A failure may, for example, cause the service to be stopped and re-commence from another location, or, it may cause the service to be continued but at a different, potentially lower quality, with lower cost charges, etc. Such service corrections are governed by the contract policy. Resource monitoring may also be used by the contract manager 80 to ensure that the ongoing services conform to the contract that was instantiated between the user and the system, for those services. Service reservations allow bookings of the services/servers so that service access at a future time may be guaranteed. This is important for group events, for example, to ensure availability of service.

The RMF features are grouped into packages, with each package including one or more classes that are highly inter-dependent. Classes are defined to implement certain required interfaces but may be specialized to provide particular support. For example, a base security interface is defined, that can be specialized, or sub-classed, to work with a particular secure service implementation. The RMF framework thus provisions an ability to construct a tailored system to meet varying needs of security, billing, user registrations etc. Via this framework, a variety of applications may be written that offer media services to endusers. The framework allows for streaming solutions to be tailored, as required, to interface via RMF defined facades. Such customization modules may include more or less code dependent on the level of match between the function as defined by the RMF facade and the function as provisioned in the existing streaming solution.

The mapping core component functionality is now explained in greater detail. Since the precise steps and criteria used during the mapping depend on the policies installed and the extensions present in the framework, the algorithm detailed below accommodates that flexibility. The negotiated mapping of requests to services and servers as implemented by a mapping algorithm, are now explained in greater detail with respect to FIG. 3, as follows:

Initially, as shown in FIG. 3, the user may invoke an RMF application 101 to play a pre-authored presentation containing a media clip. The media clip is identified in the presentation by a unique service identifier (not shown) that is designated to the clip either at authoring time and/or at when the content is published to the RMF framework. The presentation author may also add optional qualifiers to the media clip that express the author's wishes as to the type of service that should be instantiated from the content. For example, the author may require the high quality media to be used even though the same content is available in lower quality representations. In that example it may be that some visual details are important for the presentation and that the required detail is not in the lower quality clips but was lost during the compression process.

The application then generates a request 105 containing the unique service identifier for the media clip plus an optional set of service type and/or service quality qualifiers that define additional selection criteria that best suit the application and/or presentation author. This request is then sent to the RMF service requester 30 as the first stage of the mapping process. The service requester 30 acts as the application's portal to the RMF. When sent to the RMF 10, the network location of the application is added to the request so that services may be provisioned efficiently with respect to the network by choice of close proximity services where they are available.

When the service requester 30 receives the service request 105 it validates the contents to ensure conformity to the system standard request format, converts formats if required, and passes the request to an RMF negotiator 40. The negotiator may be pre-defined by either the application or the user, or may be located by the service requester using trader directories that list negotiators and their capabilities/specialties.

Next, the negotiator applies any pre-conditions to the request set before forwarding to the service mapper 50. In the basic framework, the request may be forwarded unaltered. In the extended framework user preferences may be applied, for example, if only a service identifier is present and user preferences indicate that only high quality is accepted then the request may be augmented with that criterion. These additional criteria may be used by the service mapper so that it may return a more precise mapping set.

The service mapper 50 then utilizes the service directories 60 to locate one or more media contents that match the request. In the extended framework, the mapping set may also be qualified by server availability where the set is determined also according to availability and load balancing policies. Availability is determined using resource monitoring where the availability of the service locations, i.e. the media servers, as determined by the service directories, may be ascertained. The resultant mapping set 51 is returned to the negotiator 40.

An example of the mapping technique implemented in accordance with the preferred embodiment of the RMF, for mapping ambiguous requests is now provided: Given the following user request: "find any song of this singer (first name, last name) with good enough quality at a good price that I am able to listen to," the negotiated request out of the negotiator element 40 may appear as: find type=song; keywords="first name+last name"; QoS="e.g., MP3" CostBound=$3 for access rights to a user email address (client/user@emailaddress.com). This request most likely will result in multiple content providers offering such service for example, generating the following match set:

generic-URL-1=C1 (e.g., Record Company 1), generic-URL-2=C2 (e.g., Record Company 2), etc.

Each of these content providers is interested mostly in the acquisition of the negotiated request. Note that each content provider may have multiple sites (multiple repositories or content vaults). If the user chooses their generic URL, the content provider may map the acquired negotiated request to some content vault within its organization that may be convenient to it. That is, the true specific URL having the requested media object. As long as QoS is satisfied, the user does not need to know where this content is coming from, only that is provided by this particular content provider.

Thus, the negotiation only governs the agreement up to the portal of an organization. The portal is the entry point to an organization such as Record Company 1 which translates generic URLs to specific URLs according to criteria in the organization such as internal load distribution or cost requirements.

Last, the negotiator, upon receiving the mapping set, will check the set against the original request to determine matches that should be returned to the application. In the extended framework the negotiator may have user quality preferences, cost preferences, access authorizations, etc. that may modify the mapping set when applied. For example, the user's preference may be for high quality content but may not wish to pay more than a certain amount which when exceeded a lower quality is acceptable if the cost target can be reached. In this case, upon examining the users preference and finding this quality/cost constraint, the negotiator will check the content quality for each match and consult the cost/price server to determine the cost of provisioning service with that content. If the result meets the quality/cost criteria the entry in the mapping set will be retained, otherwise, it will be discarded.

The process depicted in FIG. 3 may be repeated, by the negotiator, using each entry from mapping set until it has determined it has enough matches so that it can return to the application. If any match is good enough, i.e., falls within policy limits that determine accuracy of the match, then the negotiator may just return a single match. More than one match may be returned where the matches are not within the policy limits and the ambiguity must then be resolved by the application and/or user. Cost of the content may also be affected by the insertion of in-line advertising material that may reduce the cost if the user is prepared to view such additions. If so the negotiator may request advertising to be inserted if this is consistent with the authors presentation.

If the application receives a single match then the presentation 110 comprising, for example, the requested media stream 110 from a media server 70, may be previewed, if the user/application so desires, or just started immediately. Previewing allows the selected content to be assessed for quality/content ahead of accepting full service from that content. If more than one match was returned then the application may just simply choose the first match. It may alternatively interact with the user, potentially in conjunction with previewing the content and its quality, to determine the selection.

As mentioned with respect to FIG. 2, sources of information that may be used for mapping in the extended RMF are shown with dotted outlines to differentiate from the core RMF mapping. FIG. 2 shows service request data being received by the negotiator, which may be pre-conditioned, as described in the above algorithm, and the pre-conditioned request data is sent to the system mapper. The system mapper uses directory listings, and optional resource utilization information and statistics for load distribution and pooling, to locate one or more locations where the content may be located to provide service. The resultant data set of zero or more mappings is returned to the negotiator. The negotiator may apply, optionally in the extended RMF, security access rights, pricing preferences, user profile preferences etc, again as detailed in the above algorithm, to finally return a set of zero or more service matches to the application.

Mapping sets may be cached for later user by both the service mapper and the negotiator. Cached results may be used to satisfy future requests. For example, in the extended framework, when contract management is being enforced, that ensures the service delivery meets quality of service, then a service contract violation may require a new alternate service to be instantiated. This new service may be instantiated using one of the other matches that were cached from the original service request by the negotiator. If no cache is available or cached matches turn out to be no longer be available, then a new mapping cycle, based on the original request, may be initiated to determine a replacement service. Such service replacement, under contract violation, is also governed by installable policies that control behavior in these cases.

Figure 4:
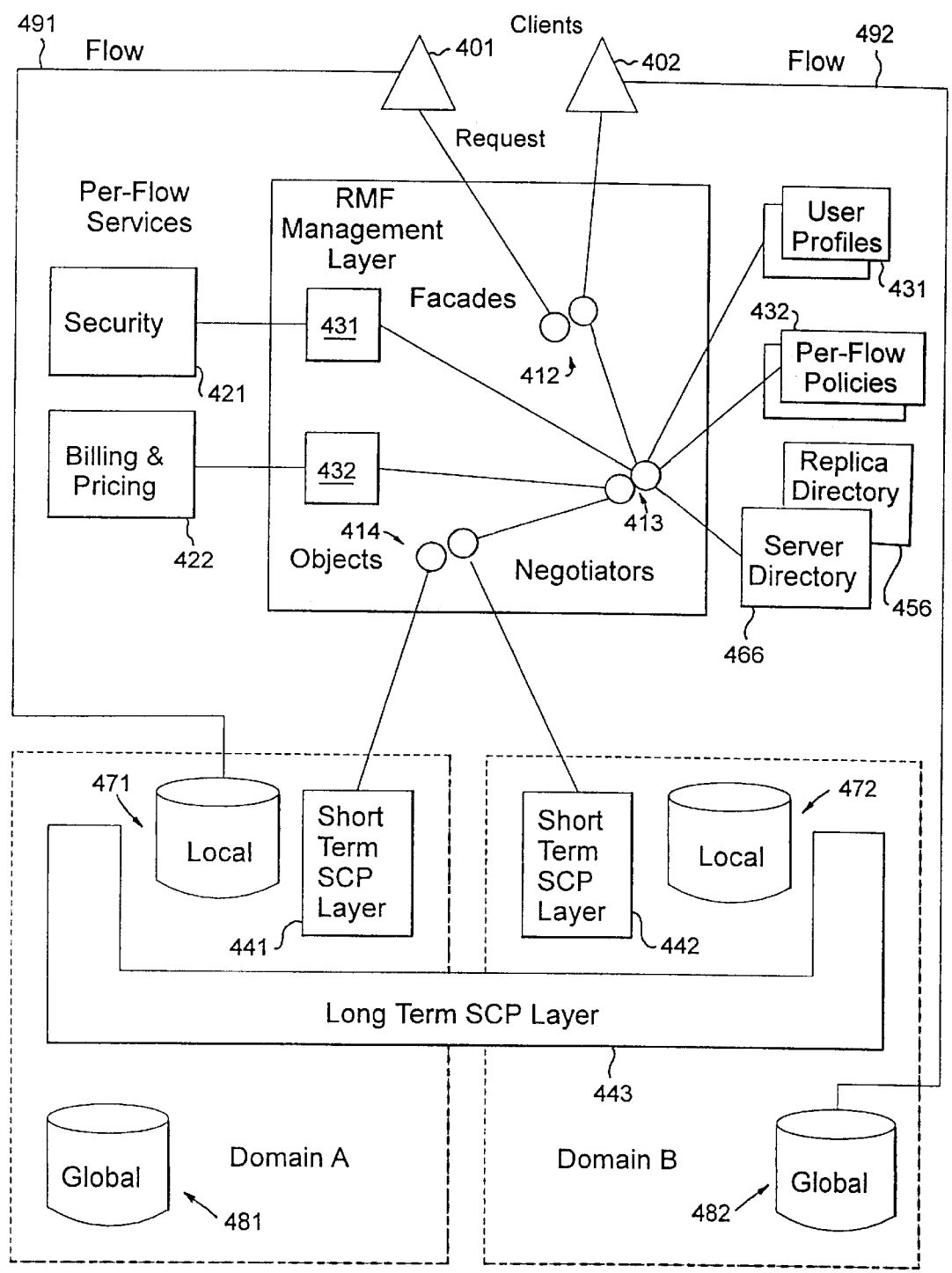
FIG. 4 an exemplary use of the framework to build a QoS browser across content repositories of multiple organizations.

FIG. 4 is an exemplary illustration depicting the coupling of the Resource Management Framework (RMF) 400 of the invention which provides a request disambiguation system as described herein, and a resource management system as described in commonly-owned, co-pending U.S. patent application Ser. No. 09/335,261 entitled SELF-REGULATED RESOURCE MANAGEMENT OF DISTRIBUTED COMPUTER RESOURCES, the whole contents and disclosure of which is incorporated by reference as if fully set forth herein. It should be understood that FIG. 4 is exemplary in nature and that there are many other possible approaches to such integration.

FIG. 4 depicts one particular embodiment which couples the service control plane (SCP) 440 and the RMF 400, such that the SCP is used to drive a disambiguated RMF-generated unique object identifier placement (i.e., to an organization) into replicas (of the organization). That is, the RMF role would be to disambiguate, explore, negotiate, and assign an application-level end-to-end QoS contract to an organization whereas the SCP role would be to efficiently place such request/contract against the resources of the organization.

As the organization may have multiple sites, each possibly containing replicas of the desired object, an SCP long-term plane 443 is provided that may be used to drive the allocation of intra-organizational resources (e.g., replicas and servers) to match expected demand. Furthermore, external resources such as the global servers, as described in related patent application Ser. No. 09/335,261, may be used to autonomously augment capacity across multiple organizations in such a manner so as to meet overall demand.

FIG. 4 further depicts a realization of the preferred embodiment for the present invention in relation with aforementioned related patent application co-pending U.S. patent application Ser. No. 09/335,261. In this environment, the RMF building blocks are used to build an exploration browser for integrating content from across multiple organizations. RMF's generated Object Identifiers would then be used to feed to the SCP's short-term plane, which would then locate replicas within the target organization whereas the SCP's long-term plane would monitor such placements to plan and allocate future capacity to meet expected demand patterns.

It should be noted that in this particular embodiment, the RMF objects are used to loosely track membership and bid access rights to organizations up to their door. To this end, the organization maintains one single RMF-compliant gate, which enables publishing and bidding for content contracts with clients. Internally, the organization promises to deliver the necessary resources to support the end-to-end contract.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for provisioning a media flow between a media server and a client of multimedia services in a distributed computer network comprising a plurality of media servers having media content and a plurality of clients, said system comprising:

service requestor means for receiving a request for media service from a client application, said service requestor means implementing a directory means comprising a list of potential,negotiator means and their corresponding capabilities/specialties for determining a negotiator means to which to forward said request;

negotiator means for receiving a request for media service from said service requestor means, said request including a service identifier indicating request for a media service; said negotiator means applying pre-conditions to said request, as necessary, according to preferences of a requestor and generating a modified request set; and mapping means for receiving said modified request set and locating possible media server devices capable of offering a requested media service, said mapping means returning a media server match set comprising said possible media server devices to said negotiator means for forwarding to a client application, whereby a possible media server is selected for providing a requested media service flow to said client application.

2. The system as claimed in claim 1, further including a service directory means including a list of one or more media server devices capable of provided a requested media service, said mapping means including means for performing look-up in said service directory means to determine said match set.

3. The system as claimed in claim 1, wherein said service requester means is interposed between said client application and said negotiator means for receiving a message containing said request for media service, validating the contents of said message to ensure conformity to a system standard request format, converting from one format to said standard request format if required, and passing the request to said negotiator means.

4. The system as claimed in claim 1, wherein said mapping means generates a set of possible mappings according to load distribution policies.

5. The system as claimed in claim 1, wherein said negotiator means further includes means for generating a new set of possible mappings from said media server match set according to additional criteria, said additional criteria includes one or more selected from the group consisting of: user preferences, rights to access the service(s), quality and cost preferences for services.

6. The system as claimed in claim 5, wherein said means for generating new set of possible mappings from said media server match set according to additional criteria, further includes a profile database containing user preferences and user registration information.

7. The system as claimed in claim 1, further comprising means for caching sets of mapping matches for subsequent use given a similar service request set.

8. The system as claimed in claim 1, further comprising means for providing said media service flow to said client application according to a negotiated level of service contract; and means for monitoring performance of said provided service flow according to said level of service contact, whereby quality of delivered media service flow as requested is ensured.

9. The system as claimed in claim 1, further including one or more service interface means for providing authentication services.

10. The system as claimed in claim 9, wherein said one or more service interface means provides authorization services.

11. The system as claimed in claim 9, wherein said one or more service interface means provides pricing services whereby media services may be offered to a client requester at a variety of cost according to a pricing policy.

12. The system as claimed in claim 11, wherein said one or more service interface means provides billing services whereby media services may be billed to the client.

13. The system as claimed in claim 11, whereby said media server comprises a controller for a media server cluster including a plurality of interconnected media servers.

14. The system as claimed in claim 9, wherein said one or more service interface means provides insertion points for services to enable bridging of an unfeasible mapping between application requirements and a media server offering into a feasible mapping via an insertion of added-value or subsidizing services onto a resultant media service flow.

15. A method for provisioning a media flow between a media server and a client of multimedia services in a distributed computer network comprising a plurality of media servers having media content and a plurality of clients, said method comprising:

receiving a request for media service at a service requestor from said client application, said service requestor implementing a directory means comprising a list of potential negotiators and their corresponding capabilities/specialties for determining a negotiator to which to forward said request;

receiving a request for media service from said service requestor at a negotiator, said request including a service identifier indicating request for a media service, said negotiator applying pre-conditions to the request, as necessary, according to preferences of a requestor and generating a modified request set;

receiving said modified request set at a service mapper and locating possible media server devices capable of offering said requested media service, said service mapper returning a media server match set comprising possible media server devices to said negotiator for forwarding to said client application; and selecting a possible media server from said server match set for providing a requested media service flow to said client application.

16. The method as claimed in claim 15, wherein prior to said selecting step, the step of generating new set of possible mappings from said media server match set according to additional criteria, said additional criteria including one or more selected from the group comprising: user preferences, rights to access the service(s), quality and cost preferences for services.

17. The method as claimed in claim 15, wherein said step of locating possible media server devices capable of offering a requested media service includes accessing a service directory means having list of one or more media server devices capable of provided a requested media service for determining said server match set.

18. The method as claimed in claim 15, wherein said step of applying pre-conditions to a request further includes steps of:

validating the contents of a request message to ensure conformity to a method standard request format;

converting from one format to said standard format if required; and passing the request to said negotiator.

19. The method as claimed in claim 15, wherein said step of locating possible media server devices includes applying system load distribution policies.

20. The method as claimed in claim 15, further including the step of caching sets of mapping matches for subsequent use given a similar service request set.

21. The method as claimed in claim 15, wherein said step of providing a requested media service flow to said client application further includes the steps of:

negotiating a level of service contract for ensuring quality of said media service flow; and monitoring performance of said provided service flow according to said level of service contract, whereby quality of delivered media service flow as requested is ensured.

22. The method as claimed in claim 15, wherein prior to said locating step, the steps of authorizing and authenticating the client requester of said requested service.

23. The method as claimed in claim 22, further including the step of offering to a client requester the requested service at a variety of costs according to one or more pricing policies.

24. The method as claimed in claim 23, further including the step of billing media services to the client requestor.

25. The method as claimed in claim 15, further including the step bridging of an unfeasible mapping between application requirements and a media server offering into a feasible mapping by inserting an added-value or subsidized service onto a media service flow.

26. A system for provisioning a media flow between a media server and a client of multimedia services in a distributed computer network comprising a plurality of media servers having media content and a plurality of clients, said system comprising:

negotiator means for receiving a request for media service from a client application, said request including a service identifier indicating request for a media service, said negotiator means applying pre-conditions to a request, as necessary, according to preferences of a requester and generating a modified request set;

service requestor means interposed between a client application and one or more negotiator means for receiving a request for media service from a client application, and determining a negotiator means to which to forward said request based on its corresponding capabilities/specialties;

mapping means for receiving said request set and locating possible media server devices capable of offering a requested media service, said mapping means returning a media server match set comprising said possible media server devices to said negotiator means for forwarding to a client application; and, service interface means for providing insertion points for services to enable bridging of an unfeasible mapping between application requirements and a media server offering into a feasible mapping via an insertion of added-value or subsidizing services onto a resultant media service flow.

27. An apparatus for searching multimedia content in a distributed network of heterogeneous servers comprising;

negotiator objects for receiving a generic request for media service from a client application, said request including one or more delivery constraints, and generating a request set including keywords indicating requested content and delivery constraint;

service requester means interposed between a client application and one or more negotiator means for receiving a request for media service from a client application, and determining a negotiator means to which to forward said request based on its corresponding capabilities/specialties;

mapping objects responsive to said request set for navigating organizational media server repositories and searching for content in terms of said keywords as well as delivery constraints and locating possible media server devices capable of offering said requested media service in accordance with said delivery constraints, said mapping objects returning a media server match set comprising said possible media server offerings to said negotiator objects for forwarding to a client application; and means for bridging an unfeasible mapping between application requirements and a media server offering into a feasible mapping via an insertion of added-value or subsidizing services onto a resultant media service flow.

28. The apparatus as claimed in claim 27, wherein said delivery constraints includes static constraints comprising format, resolution, and access rights to said media content as well as qualifying dynamic constraints including cost and quality of service.

* * * * *